US010036640B2

(12) United States Patent
Hardt

(10) Patent No.: US 10,036,640 B2
(45) Date of Patent: Jul. 31, 2018

(54) METHOD OF EMBEDDING MAP FEATURE DATA INTO A RASTER GRAPHICS FILE

(75) Inventor: Michael Hardt, Canaan, NH (US)

(73) Assignee: TOMTOM GLOBAL CONTENT B.V., Amsterdam (NL)

(*) Notice: Subject to any disclaimer, the term of this patent is extended or adjusted under 35 U.S.C. 154(b) by 984 days.

(21) Appl. No.: 13/504,488

(22) PCT Filed: Dec. 31, 2009

(86) PCT No.: PCT/US2009/069951
§ 371 (c)(1),
(2), (4) Date: Jul. 12, 2012

(87) PCT Pub. No.: WO2011/053337
PCT Pub. Date: May 5, 2011

(65) Prior Publication Data
US 2012/0278505 A1 Nov. 1, 2012

Related U.S. Application Data

(60) Provisional application No. 61/279,981, filed on Oct. 29, 2009.

(51) Int. Cl.
G06F 15/16 (2006.01)
G01C 21/32 (2006.01)
G01C 21/36 (2006.01)
G09B 29/00 (2006.01)
G08G 1/0962 (2006.01)

(52) U.S. Cl.
CPC ......... G01C 21/32 (2013.01); G01C 21/3679 (2013.01); G08G 1/09623 (2013.01); G09B 29/007 (2013.01)

(58) Field of Classification Search
CPC .......... G06F 17/30241; G06F 17/3025; G06F 17/30253; G06F 17/30256; G06F 17/30271; G06F 3/14; G06K 15/1836; G06K 15/1853; G06K 15/1856; G06K 15/1861; G06T 15/04; G06T 17/05; G06T 19/00;
(Continued)

(56) References Cited

U.S. PATENT DOCUMENTS 8,274,506 B1* 9/2012 Rees ................. G06T 17/05
345/419
8,816,883 B2* 8/2014 Rottig .................. G01S 19/14
340/988
(Continued)

FOREIGN PATENT DOCUMENTS

EP 1912196 A1 4/2008
JP 2005084064 A 3/2005

OTHER PUBLICATIONS

International Search Report dated Feb. 12, 2010 for International Application No. PCT/US2009/069951.

Primary Examiner — Larry Donaghue
Assistant Examiner — Patrick Ngankam

(57) ABSTRACT

A method for providing map data composed of providing geospatial map data pre-rendered into a plurality of raster graphic files, where each of the raster graphic files comprising a plurality of image pixels each having pixel data information Additional map data is embedded into at least one of the raster graphic files by altering the pixel data information The additional map data is then delivered simultaneously with the raster graphics files.

16 Claims, 3 Drawing Sheets

(58) Field of Classification Search
CPC .............. G01C 21/32; G01C 21/3679; G08G 1/09623; G09B 29/007
USPC .................. 709/238, 246; 715/700, 748
See application file for complete search history.

(56) References Cited

U.S. PATENT DOCUMENTS

| | | |
|---|---|---|
| 2003/0236618 A1* | 12/2003 | Kamikawa .......... G01C 21/3647 340/995.14 |
| 2006/0041375 A1* | 2/2006 | Witmer ................ G01C 15/00 701/532 |
| 2006/0094466 A1 | 5/2006 | Tran |
| 2007/0176796 A1 | 8/2007 | Bliss et al. |
| 2007/0185651 A1 | 8/2007 | Motoyama et al. |
| 2008/0059889 A1 | 3/2008 | Parker et al. |
| 2009/0093955 A1* | 4/2009 | Geelen ................ G09B 29/106 701/431 |

* cited by examiner

| Red 28 | Green 30 | Blue 32 | Transparency 34 |
|---|---|---|---|
| 30% | 20% | 50% | |

| Red 28 | Green 30 | Blue 32 | Added Channel 34 |
|---|---|---|---|
| 16% | 24% | 60% | Road Flag |

METHOD OF EMBEDDING MAP FEATURE DATA INTO A RASTER GRAPHICS FILE

CROSS-REFERENCES TO RELATED APPLICATIONS

This application is the National Stage of International Application No. PCT/US2009/069951, filed on Dec. 31, 2009 and designating the United States. The entire content of this application is incorporated herein by reference. The application claims priority from U.S. Provisional Application No. 61/279,981, filed Oct. 29, 2009; the entire contents of which is also incorporated herein by reference.

BACKGROUND OF THE INVENTION

1. Field of the Invention

This invention relates generally to a system and method for transmitting digital maps and geospatial data to portable devices. More particularly, this invention relates to a method for embedding map feature data into pre-rendered geospatial map graphic files.

2. Related Art

Personal navigation devices have traditionally relied on combining internally stored digital maps with positioning data from GPS or other data streams. Internal storage of digital maps, however, is not always practical, efficient, or desirable. Mobile devices such as phones have begun implementing software to act as navigation devices. Storage of complete digital map files for a given region is not always desirable on such devices due to limitations in storage and processing. In addition, storage on local devices can result in a lack of current information such as traffic or construction. The increased access to the internet has generated the possibility of streaming digital map data to personal computers, mobile phones, and even in-vehicle navigation systems.

In order to serve the geospatial map data efficiently over the internet, the map data is commonly pre-rendered into raster graphic files. These raster graphic files are used to define an image by way of a matrix of pixel values, each of the pixel values representing the color of a pixel in the image. By limiting the map data to pre-rendered raster graphic files, the existing system is capable of serving these images over the internet to portable devices fast enough for a relatively smooth end user experience. A drawback of this existing system, however, is that the pre-rendered raster graphic file pixels contain no additional useful information above the map image.

When serving geospatial map data over the internet, the map data may be accessed by a wide variety of devices and by a wide variety of users. When utilizing pre-rendered raster graphics files, the raster image commonly appears on the client's device exactly as it was pre-rendered. This fails to allow for customized map styles to address the relative display size of given devices, to support low-light viewing, to adjust for individual preference, or for custom styles wherein a company may desire colors and fonts that match their corporate brand. In addition, the raster graphics file contains no useful map data that could be utilized to identify a road on the image. This lack of element identification results in the inability to snap a device's location to the road which in turn makes turn-by-turn navigation difficult to implement. Another drawback is that the pre-rendered raster files have been rendered only at particular, incremental zoom levels, and sometimes it is desirable to display intermediate zoom levels or to continuously zoom in and out of the map.

Existing systems have approached this dilemma by sending vector data over the internet rather than raster data. This often results in the end image needing to be rendered by the client device. Mobile devices are, unfortunately, often underpowered in rasterizing. Another approach has been to store vector data locally on the device. This requires higher storage capabilities of devices. In addition, when improvements are made to the vector data, they must be updated on a host of individual devices. By serving the data from a central internet server, instantaneous updates can be made available to all clients. Therefore, a methodology that incorporated the benefits of internet streaming while limiting device processing/rendering and limiting device storage requirements would be highly beneficial.

It has been known that it is possible to embed color profiles within the raster image data so that the information can be used in color matching modules. It has also been known that pixel shading can be utilized to embed information utilizing graphics acceleration hardware. The use of digital watermarking on photographs has been utilized to embed a host of information. The present invention contemplates utilizing such technology to address the issues facing internet delivery of map data.

It is an object of the present invention to provide a method of embedding non-visual data within the pixels of a pre-rendered map image file to allow for visual and non-visual data to be transmitted simultaneously.

SUMMARY OF THE INVENTION AND ADVANTAGES

These and other objects and advantages are achieved according to one aspect of the invention by a method for providing map data comprised of providing geospatial map data pre-rendered into a plurality of raster graphic files, where each of the raster graphic files comprises a plurality of image pixels each having pixel data information. Additional map data is embedded into at least one of the raster graphic files by altering the pixel data information. The additional map data is then delivered simultaneously with the raster graphics files.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Referring to the Figures, wherein like numerals indicate like or corresponding parts throughout the several views, this invention pertains to digital transportation network navigation systems and to the digital maps, databases and devices used by navigation systems. By "digital transportation network", it is meant to include digital mapping systems for various established transportation networks, including various roadway surfaces for motorized and non-motorized vehicles, walking, biking, skiing and hiking trails, and other established routes along which users of navigations devices travel for business or pleasure. For purposes of this invention, the term "roadway" is intended to be used in a most general way and to be inclusive of all paved and unpaved roads, paths, trails and the like for use by any type of vehicle or a pedestrian.

Figure 1:
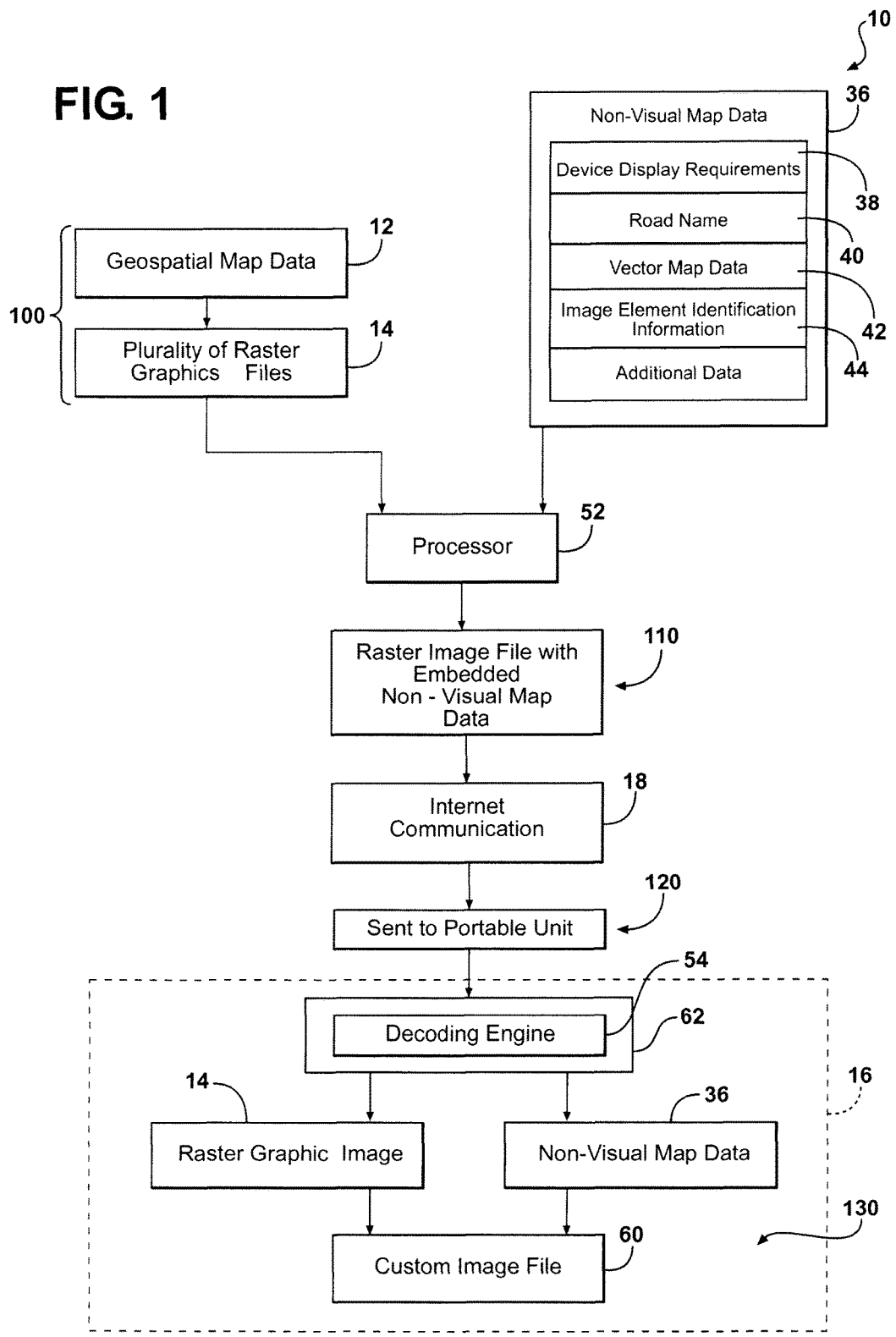
FIG. 1 is a schematic view of a system and method of providing map data in accordance with the present invention.
Figure 2:
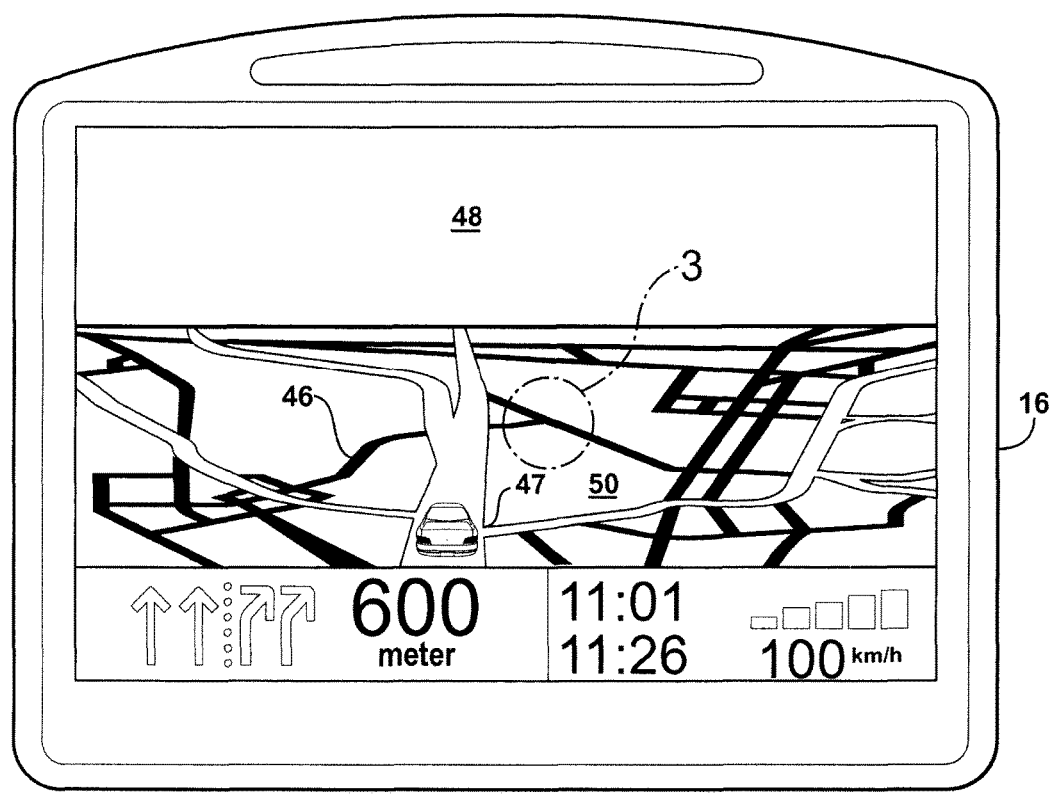
FIG. 2 is an illustration of a Portable Navigation Device (PND) depicting a data map as a raster graphics file in accordance with the present invention.

Referring now to FIG. 1, which is a schematic representation of a system for providing digital navigation information 10. The method utilized includes a geospatial map data 12 pre-rendered into a plurality of raster graphics files 14. It is intended that in one embodiment, the raster graphics files 14 will be graphical representations of roads, pathways, and other landmarks. In other embodiments, it is contemplated that the raster graphic files will be photographic images of such roads, pathways, or landmarks. An example of one of the plurality of raster graphics files 14 is illustrated in FIG. 2, the graphics file 14 displayed on a portable navigation device 16. Although a dedicated portable navigation device 16 is illustrated, it should be understood that the term portable navigation device 16 is intended to encompass any device capable of displaying visual map data such as cell phones.

The present invention contemplates streaming a series of such plurality of raster graphics files 14 to the portable navigation device 16 to provide maps and directions as opposed to storing the entire geospatial map data 12 entirely on the portable navigation device 16. This allows access to the geospatial map data 12 by a wide range of devices without requiring portable storage. In at least one embodiment, the present invention contemplates streaming the series of the plurality of raster graphics files 14 over the internet 18. This may include wifi connections, wireless data plans, or other methods of transmission. By transmitting the geospatial map data 12 as simple raster graphics files 14 the images can be transmitted over wireless networks and allow for usage over a wide range of devices with relatively low device processing.

Figures 3, 4, 5:
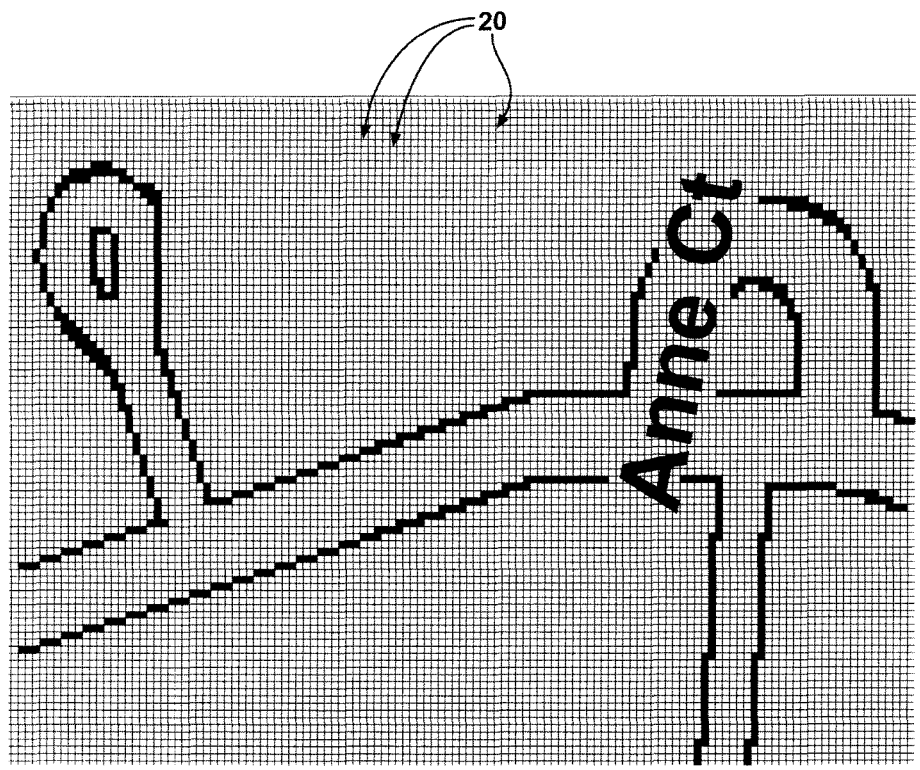
FIG. 3 is a detailed illustration of a series of pixels representing a portion of the raster graphics file illustrated in FIG. 2.
FIG. 4 is a detailed illustration of a single pixel data packet for one of the series of pixels illustrated in FIG. 3.
FIG. 5 is a detailed illustration of an alternate embodiment of the single pixel data packet illustrated in FIG. 4.

Each of the plurality of raster graphics files 14 comprises a visual image generated by a plurality of image pixels 20 (see FIGS. 3 and 4). The plurality of image pixels 20 are preferably arranged in a matrix representing a final visual image. In order to generate a visual image using the plurality of pixels 20, each pixel 22 is comprised of a pixel data packet 24 controlling the color of the pixel 22. Although a variety of pixel data packets 24 are contemplated, one pixel data packet 24 is illustrated in FIG. 4 as comprised of four data channels 26. In this example, the channels 26 represent a red channel 28, a green channel 30, a blue channel 32, and a transparency channel 34. In such an arrangement, the data value stored in each packet represents the percentage of the appropriate color. As known in the art, mixing various color values allows an individual pixel 22 to be any one of a variety of colors. The transparency channel 34 is utilized to control the transparency vs. opaque quality of the individual pixel 22. It should be understood that the term "data packet" is not intended to be limiting past referring to pixel data. A variety of graphics file formats are contemplated, including those which use compression algorithms that don't use "data packets" within a strict definition.

Although transmission of raster graphics files 14 representing geospatial map data 12 to a portable navigation device 16 transmits a visual image, the known visual images fail to include a wide variety of non-visual map data 36. This non-visual map data 36 may comprise information controlling a specific device's display requirements 38. In another example the non-visual map data 36 may include a road name 40. In another embodiment, the non-visual map data 36 may be comprised of vector map data 42. In still another embodiment, the non-visual map data 36 may include image element identification information as to whether an individual pixel 22 represents a road 46, an intersection 47, the sky 48, or landscape 50, for example. All of this non-visual map data 36 is important for use over a range of devices, road name information, and turn-by-turn navigation directions. In particular, this information can be utilized to snap the device 16 location to a road 46 for turn-by-turn directions.

In the past, the only way to get the non-visual map data 36 to the portable navigation device 16 was to transmit it independently or store it locally on the device. As mentioned, local storage is not always an option and independent transmission often encounters bandwidth and transmission speed issues. The present invention, therefore, contemplates utilizing a processor 52 to embed the non-visual map data 36 into the raster graphics files 14. This can be accomplished in a variety of fashions. In one embodiment, it is contemplated that the non-visual map data 36 is embedded by way of varying pixel color such as by shading. This would simply require altering a pixel 22 data channels 28,30,32,34 in a predictable fashion such that it would not significantly alter the visual image but could be decoded by a decoding engine 54 located on the portable navigation device 16 to parse the pixel data packet 26 information from the raster graphics image 14 to extract the non-visual map data 36. In another embodiment, an additional channel or a non-used channel such as the transparency channel 34 could be utilized to send the non-visual map data 36. Finally, it is contemplated that a channel such as the transparency channel 34 could contain a flag value 56 such that the individual pixel 22 is associated with an visual element such as a road 46.

The present invention operates by way of proving the geospatial map data 12 to a portable navigation device 16 by way of pre-rendering the geospatial map data 12 into a plurality of raster graphics files 14 (100). The present invention embeds non-visual map data 36 into the plurality of raster graphics files 14 (110) prior to transmitting the raster graphics files 14 to the portable navigation device 16 (120). A decoding engine 54 located on the portable navigation device 16 is then utilized to separate the non-visual map data 12 from the raster graphics files 14 such that the image and the non-visual map data 12 may be utilized on the portable navigation device 16 (130). The non-visual map data 36 may be used to alter the raster graphics files/alter device operation 14 to generate a custom image file/custom command 60 for use on the portable navigation device (140). This could compare vehicle speed to embedded speed limits, for example, to alert a driver if the driver is speeding. In at least one embodiment, the non-visual map data 36 may be parsed from the raster graphics file utilizing graphics acceleration hardware 62.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly, the scope of legal protection afforded this invention can only be determined by studying the following claims.

What is claimed is:

1. A method for providing digital geospatial information comprising the steps of:
   providing geospatial map data pre-rendered into a plurality of raster graphic files, each of said raster graphic files comprising a plurality of image pixels each comprised of a pixel data packet, each pixel data packet including original values for a plurality of data channels;
   embedding non-visual map data into at least one of said raster graphic files by altering said pixel data packet information within said plurality of image pixels in the at least one of said raster graphic files, the altering comprising changing values for one or more data channels of corresponding pixel data packets from the original values to updated values based on the non-visual map data, thereby including, in the one or more data channels of the pixel data packet, a representation of the non-visual map data; and
   delivering said at least one of said raster graphic files to a portable navigation device, said non-visual map data embedded in said at least one of said raster graphic files configured to be used by said portable navigation device to alter a corresponding raster graphics file when generating an image for display or to be used to generate a navigation command on said portable navigation device.

2. A method as set forth in claim 1, wherein said embedding non-visual map data comprises varying color data within said pixel data packet.

3. A method as set forth in claim 1, wherein said embedding non-visual map data comprises including an additional data channel within said pixel data packet.

4. A method as set forth in claim 1, wherein said non-visual map data comprises customized map display information.

5. A method as set forth in claim 1, wherein said non-visual map data comprises image element identification information.

6. A method as set forth in claim 5, wherein said image element identification information comprises a flag value indicating a particular pixel represents part of a road segment.

7. A method as set forth in claim 5, wherein said image element identification information comprises an indication that a particular pixel represents an intersection.

8. A method as set forth in claim 1, wherein said non-visual map data comprises information necessary to snap a device location to a road for turn-by-turn directions.

9. A method as set forth in claim 1, further comprising:
   parsing said pixel data packet from said plurality of image pixels; and
   modifying one of said raster graphic files using said pixel data packet information to generate a custom image file.

10. A method as set forth in claim 1 further comprising:
    parsing said pixel data packet from said plurality of image pixels; and
    utilizing said pixel data packet information for turn-by-turn directions.

11. A method as set forth in claim 10 wherein said pixel data packet is parsed using graphics acceleration hardware.

12. A system for streaming digital geospatial information to a portable navigation device comprising:
    geospatial map data rendered into a plurality of raster graphic files, each of said raster graphic files comprising a plurality of image pixels each having pixel data packet, each pixel data packet including original values for a plurality of data channels;
    non-visual map data; and
    a processor configured to embed said non-visual map data into at least one of said raster graphic files by altering said pixel data packet information within said plurality of image pixels in the at least one of said raster graphic files, the altering comprising changing values for one or more data channels of corresponding pixel data packets from the original values to updated values based on the non-visual map data, thereby including, in the one or more data channels of the pixel data packet, a representation of the non-visual map data;
    said processor further configured to deliver said at least one of said raster graphic files to said portable navigation device, said non-visual map data embedded in said at least one of said raster graphic files configured to be used by said portable navigation device to alter a corresponding raster graphics file when generating an image for display or to be used to generate a navigation command on said portable navigation device.

13. A system as described in claim 12, wherein said non-visual map data comprises device display information.

14. A system as described in claim 12, wherein said non-visual map data comprises information required for turn-by-turn directions.

15. A system as described in claim 12, wherein said non-visual map data is embedded in said raster graphics files by way of varying color data within said pixel data packets.

16. A system as described in claim 12, wherein said non-visual map data is embedded in said raster graphics files by way of including an additional data channel within said pixel data packet.

* * * * *